United States Patent [19]

Satake et al.

[11] Patent Number: 4,826,906
[45] Date of Patent: May 2, 1989

[54] POLY(ARYLENE THIOETHER-KETONE) COMPOSITIONS IMPROVED IN BOTH MELT STABILITY AND CRYSTALLINITY

[75] Inventors: Yoshikatsu Satake; Ken Kashiwadate; Yo Iizuka; Toshitaka Kouyama; Takayuki Katto; Zenya Shiiki, all of Iwaki, Japan

[73] Assignee: Kureha Kagaku Kogyo K.K., Tokyo, Japan

[21] Appl. No.: 208,226

[22] Filed: Jun. 17, 1988

[30] Foreign Application Priority Data

Jun. 22, 1987 [JP] Japan ................................ 62-154801
Sep. 3, 1987 [JP] Japan ................................ 62-221122
Jun. 11, 1988 [JP] Japan ................................ 63-142772

[51] Int. Cl.$^4$ .............................................. C08G 65/38
[52] U.S. Cl. .................................... 524/381; 524/394; 524/396; 524/400; 524/405; 524/417; 524/425; 524/430; 524/433; 524/592; 525/123; 525/390; 525/398; 525/420; 525/437; 525/461; 525/471; 528/226
[58] Field of Search ............... 524/381, 394, 396, 400, 524/405, 417, 425, 430, 433, 592; 525/123, 390, 398, 420, 437, 461, 471; 528/226

[56] References Cited

U.S. PATENT DOCUMENTS

| 3,386,950 | 6/1968 | Horvath et al. | 524/392 |
| 3,408,342 | 10/1968 | Horvath et al. | 524/247 |
| 3,590,104 | 5/1986 | Zeiner | 558/100 |
| 3,658,753 | 4/1972 | Reed | 524/135 |
| 4,405,745 | 9/1983 | Mathis et al. | 528/388 |
| 4,411,853 | 10/1983 | Reed et al. | 264/169 |
| 4,413,081 | 11/1983 | Mathis et al. | 524/202 |
| 4,418,029 | 11/1983 | Reed et al. | 264/169 |
| 4,421,910 | 12/1983 | Mathis et al. | 525/537 |
| 4,434,122 | 2/1984 | Reed | 264/211 |
| 4,478,969 | 10/1984 | Reed et al. | 524/106 |
| 4,482,683 | 11/1984 | Quella et al. | 525/537 |
| 4,535,117 | 8/1985 | Mathis et al. | 525/397 |
| 4,543,224 | 9/1985 | Reed et al. | 264/211 |
| 4,588,789 | 5/1986 | Scoggins et al. | 525/537 |
| 4,613,654 | 9/1986 | Katto et al. | 525/537 |
| 4,690,972 | 9/1987 | Johnson et al. | 524/609 |
| 4,716,212 | 12/1987 | Gaughan | 528/226 |
| 4,745,167 | 5/1988 | Iizuka et al. | 526/262 |
| 4,746,698 | 5/1988 | Kouyama et al. | 525/396 |
| 4,772,679 | 9/1988 | Fukawa et al. | 528/226 |

FOREIGN PATENT DOCUMENTS

| 270955 | 6/1988 | European Pat. Off. . |
| 274754 | 7/1988 | European Pat. Off. . |
| 3405523 | 8/1985 | Fed. Rep. of Germany . |
| 47-13347 | 7/1972 | Japan . |
| 60-58435 | 4/1985 | Japan . |
| 60-104126 | 6/1985 | Japan . |
| 60-149661 | 8/1985 | Japan . |
| 60-240731 | 11/1985 | Japan . |
| 61-221229 | 10/1986 | Japan . |
| 62-109850 | 5/1987 | Japan . |

OTHER PUBLICATIONS

*Indian J. Chem.*, vol. 21A, May 1982, pp. 501–502.
*Indian Journal of Pure and Applied Physics*, vol. 22, Apr. 1984, pp. 247–248.
*Mol. Cryst. Liq. Cryst.*, vol. 83, 1982, pp. 229≧238.

Primary Examiner—Morton Foelak
Attorney, Agent, or Firm—Lowe, Price, LeBlanc, Becker & Shur

[57] ABSTRACT

Disclosed herein is a poly(arylene thioether-ketone) composition improved in melt stability and crystallinity, which comprises (A) 100 parts by weight of a melt-stable poly(arylene thioether-ketone) (PTK) and (B) 0.1–30 parts by weight of at least basic compound selected from the group consisting of the hydroxides, oxides and aromatic carboxylic acid salts of Group IIA metals of the periodic table other than magnesium and the hydrocarbyl oxides, aromatic carboxylic acid salts, carbonates, hydroxides, phosphates and borates of Group IA metals of the periodic table. The phosphates and borates include condensation products. The PTK has predominant recurring units of the formula

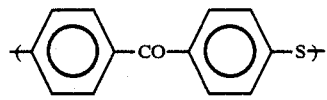

and having a melting point, Tm of 310°–380° C., a residual melt crystallization enthalpy, ΔHmc (420° C./10 min) of at least 10 J/g, a melt crystallization peak-temperature, Tmc (420° C./10 min) of at least 210° C. and a reduced viscosity of 0.2–2 dl/g.

5 Claims, No Drawings

POLY(ARYLENE THIOETHER-KETONE) COMPOSITIONS IMPROVED IN BOTH MELT STABILITY AND CRYSTALLINITY

FIELD OF THE INVENTION

This invention relates to poly(arylene thioether-ketone) compositions improved in both melt stability and crystallinity, wherein said poly(arylene thioether-ketone) has predominant recurring units of the formula

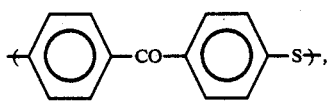

and more specifically to a composition comprising a melt-stable poly(arylene thioether-ketone) and a stabilizer, which is composed of a basic compound, and permitting application of conventional melt processing techniques.

When subjected to melt molding or forming, the compositions of this invention undergo less variations in melt viscosity and provide molded or formed products improved in decrease of crystallinity.

BACKGROUND OF THE INVENTION

With the advance of weight-, thickness- and length-reducing technology in the field of the electronic and electric industry and with the recent advancement of weight-reducing technology in the fields of the automobile, aircraft and space industres, there has been a strong demand for crystalline thermoplastic resins having heat resistance of about 300° C. or higher and permitting easy melt processing in recent years.

As crystalline, heat-resistant, thermoplastic resins developed to date, there are, for example, poly(butylene terephthalate), polyacetal, poly(p-phenylene thioether), etc. These resins are however unable to meet the recent requirement level for heat resistance.

Polyether ether ketones (hereinafter abbreviated as "PEEKs") and polyether ketones (hereinafter abbreviated as "PEKs") have recently been developed as heat-resistant resins having a melting point of about 300° C. or higher. These resins are crystalline thermoplastic resins. It has therefore been known that conventional melt processing techniques such as extrusion, injection molding and melt spinning can be applied to easily form them into various molded or formed products such as extruded products, injection-molded products, fibers and films.

These resins however use expensive fluorine-substituted aromatic compounds such as 4,4'-difluorobenzophenone as their raw materials. Limitations are thus said to exist to the reduction of their costs. It is also pointed out that these resins involve a problem in expanding their consumption.

Based on an assumption that poly(arylene thioether-ketones) (hereinafter abbreviated as "PTKs") could be promising candidates for heat-resistant thermoplastic resins like PEEKs and PEKs owing to their similarity in chemical structure, PTKs have been studied to some extent to date. There are some disclosure on PTKs, for example, in Japanese Patent Laid-Open No. 58435/1985 (hereinafter referred to as "Publication A"), German Offenlegungsschrift No. 34 05 523A1 (hereinafter referred to as "Publication B"), Japanese Patent Laid-Open No. 104126/1985 (hereinafter referred to as "Publication C"), Japanese Patent Laid-Open No. 13347/1972 (hereinafter referred to as "Publication D"), Indian J. Chem., 21A, 501–502 (May, 1982) (hereinafter referred to as "Publication E"), and Japanese Patent Laid-Open No. 221229/1986 (hereinafter referred to as "Publication F").

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

It was attempted to produce some molded or formed products in Publications A and B. Since the PTKs had poor melt-stability, certain specified types of molded or formed products were only obtained by a special molding or forming process, where PTKs were used only as a sort of binder, being impregnated into a great deal of reinforcing fibers of main structural materials and molded or formed under pressure.

Since the conventional PTKs are all insufficient in melt stability as described above, it has been unable to obtain molded or formed products from them by applying conventional melt processing techniques.

The present inventors conducted an extensive investigation with a view toward developing a process for economically producing a PTK which has melt stability permitting the application of conventional melt processing techniques.

First of all, the present inventors chose economical dichlorobenzophenone and dibromobenzophenone as raw materials instead of employing expensive fluorine-substituted aromatic compounds. In addition, a polymerization process was designed in an attempt to conduct polymerization by increasing the water content in a polymerization system to an extremely high level compared to processes reported previously, adding a polymerization aid and suitably controlling the profile of the polymerization temperature. As a result, it was found that a high molecular-weight PTK would be obtained economically.

The high molecular-weight PTK obtained by the above new process was however still dissatisfactory in melt stability. As a next step, the present inventors made further improvements to the polymerization process. It was then revealed that PTKs, which were improved significantly in melt stability compared to the conventional PTKs and hence permitted the application of conventional melt processing techniques, can be obtained by conducting polymerization in a system free of any polymerization aid while paying attention to the selection of a charge ratio of monomers, the shortening of the polymerization time at high temperatures, the selection of a material for a polymerization reactor and optionally, by applying a stabilization treatment in a final stage of the polymerization. It was also found that molded and formed products such as extrusion products, injection-molded products, fibers and films would be obtained successfully and easily from such melt-stable PTKs by conventional melt processing techniques.

Even melt-stable PTKs permitting the application of these conventional melt processing techniques were however still unable to avoid certain degrees of thermal modification and deterioration when melt-processed from powdery polymers into pellets or molded or formed products, whereby they underwent melt viscosity increase and/or decrease of crystallinity and develop sticking of thermal decomposition products to resin residence areas of melt processing equipment. They hence involved a problem that difficulties were encountered in determining appropriate conditions for their melt processing.

It therefore arose, as a subject to be investigated, to make further improvements to the melt stability of the melt-stable PTKs upon their melt processing.

With a view toward preventing melt viscosity increase and/or decrease of crystallinity and sticking of thermal decomposition products to resin residence areas of melt processing equipment, the present inventors tried to improve physical properties of the above-described melt-stable PTKs by adding thereto various heat stabilizers known conventionally as heat stabilizers for poly(arylene thioethers) (PATEs), such as those to be described next.

Namely, it was attempted to make further improvements to the melt stability of the melt-stable PTKS upon melt processing by adding, as heat stabilizers, organic thiols (U.S. Pat. No. 3,386,950), organic hydroxylamines (U.S. Pat. No. 3,408,342), organophosphinic acids and organophosphites (U.S. Pat. No. 3,658,753), inorganic nitrites (U.S. Pat. No. 4,405,745), organotin compounds (U.S. Pat. No. 4,411,853), dithiocarbamates (U.S. Pat. No. 4,413,081), alkaline earth metal salts of fatty acids (U.S. Pat. No. 4,418,029), dithiophosphinic acid salts (U.S. Pat. No. 4,421,910), phenolamides and phenolesters (U.S. Pat. No. 4,434,122), aminotriazoles (U.S. Pat. No. 4,478,969), sorbic acid salts (U.S. Pat. No. 4,535,117 and U.S. Pat. No. 4,543,224), aromtic ketones, aromatic amines, aromatic amides and aromatic imides (U.S. Pat. No. 4,482,683), etc.

It was however unable to find anything among these compounds, which would show effects in improving the melt stability of the PTKs.

OBJECTS AND SUMMARY OF THE INVENTION

An object of this invention is to provide PTK compositions excellent in melt stability upon melt processing.

Another object of this invention is to provide PTK compositions prevented, upon melt processing, from melt visosity increase and decrease of crystallinity and also from sticking of thermal decomposition products to resin residence areas of melt processing equipment.

The present inventors have proceeded with a further investigation. As a result, it has been found surprisingly that when particular basic compounds not regarded as heat stabilizers for polymers such as PATE to date, such as the hydroxides, oxides and aromatic carboxylates of Group IIA metals (except for magnesium) of the periodic table and the hydrocarbyl oxides, aromatic carboxylic acid salts, carbonates, hydroxides, phosphates and borates of Group IA metals of the periodic table are added to the melt-stable PTKs, their melt stability upon melt processing can be improved and the melt viscosity increase and decrease of crystallinity due to a crosslinking reaction or the like can be effectively reduced or prevented. As a result of thermogravimetric analysis, it has also been found that the decomposition starting temperatures of the melt-stable PTKs can be improved.

Incidentally, it has heretofore been disclosed to treat PATE with a solution of a water-soluble salt of a monovalent metal of Group IA of the periodic table, i.e., an alkali metal or a divalent metal of Group IIA of the periodic table, i.e., an alkaline earth metal, thereby decreasing the melt flow index of PATE, in other words, increasing the melt viscosity of PATE to give influence to the crystallization of PATE (Japanese Patent Laid-Open No. 149661/1985), to increase the melt viscosity of PATE significantly by reacting PATE and a strongly basic metal compound and forming a complex (Japanese Patent Laid-Open No. 240731/1985), to feed the hydroxide or oxide of a Group IIA metal of the periodic table or an aromatic carboxylic acid salt of a Group IA or Group IIA metal of the periodic table for the prevention of corrosion of melt-forming equipment by PATE (Japanese Patent Laid-Open No. 109850/1987), etc.

It has however been found by the present inventors that in the case of a mixture of PATE and an alkali metal salt or alkaline earth metal salt, the melt viscosity of PATE gradually decreases when the mixture is maintained at its processing temperature.

The effects of the above-described basic compounds for the improvement of melt stability, namely, their effects of minimizing variations in melt viscosity at elevated temperatures and preventing or reducing the decrease of crystallinity have been found to be novel effects that are not observed with PATE and conventionally-known PTKs of poor melt stability but are exhibited specifically with the melt-stable PTKs employed in this invention. This fact is totally unexpected and is interesting.

Incidentally, basic compounds which have low heat resistance and are prone to evaporation at processing temperatures for compositions containing a melt-stable PTK, for example, fatty acid salts and aryl fatty acid salts ted to undergo evaporation or foaming upon melt processing and are therefore not preferable.

It has also been found that molded or formed products such as extruded products, injection-molded products, fibers or films improved significantly in the problems of melt viscosity increase and decrease of crystallinity and sticking of thermal decomposition products to resin residence areas of melt processing equipment upon conventional melt processing and having excellent physical properties can be obtained from a composition obtained by adding a basic compound to a melt-stable PTK and optionally incorporating at least one of thermoplastic resins and at least one of fibrous fillers and/or at least one of inorganic fillers.

The present invention has been brought to completion on the basis of these findings.

In one aspect of this invention, there is thus provided a melt-stable poly(arylene thioether-ketone) composition improved in melt stability and crystallinity, comprising:

(A) 100 parts by weight of a melt-stable poly(arylene thioether-ketone) having predominant recurring units of the formula

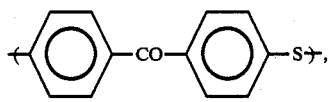

wherein the —CO— and —S— are in the para position to each other, and having the following physical properties (a)-(c):

(a) melting point, Tm being 310°–380° C.;
(b) residual melt crystallization enthalpy, ΔHmc (420° C./10 min) being at least 10 J/g, and melt crystallization peak-temperature, Tmc (420° C./10 min) being at least 210° C., wherein ΔHmc (420° C./10 min) and Tmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a rate of 75° C./min and then held for 10 minutes at 420° C.;
(c) reduced viscosity being 0.2–2 dl/g as determined by viscosity measurement at 25° C. and a polymer concentration of 0.5 g/dl in 98 percent by weight sulfuric acid; and (B) 0.1–30 parts by weight of at least one basic compound selected from the group consisting of the hydroxides, oxides and aromatic carboxylic acid salts of Group IIA metals of the periodic table other than magnesium, and the hydrocarbyl oxides, aromatic carboxylic acid salts, carbonates, hydroxides, phosphates and borates of Group IA metals of the periodic table, said phosphates and borates including condensation products.

Compositions of this invention may be added with at least one of thermoplastic resins (Component C) and at least one of fibrous fillers and/or at least one of inorganic fillers (Component D) as desired. From these compositions, molded or formed products such as extruded products, injection-molded products, fibers or films improved significantly in the problems of melt viscosity increase and decrease of crystallinity and sticking of thermal decomposition products to resin residence areas of melt processing equipment upon conventional melt processing and having excellent physical properties can be obtained.

DETAILED DESCRIPTION OF THE INVENTION

Features of the present invention will hereinafter be described in detail.

Component A (Melt-Stable PTKs)

Chemical structure of PTKs

The melt-stable PTKs useful in the present invention are poly(arylene thioether-ketones) having predominant recurring units of the formula

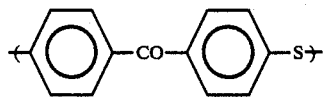

wherein the —CO— and —S— are in the para position to each other.

In order to be heat-resistant polymers, the PTKs employed in this invention may preferably contain the above recurring units in a proportion of at least 50 wt. %, more preferably, of 60 wt. % or higher, most preferably, of 70 wt. % or higher. If the proportion of the recurring units is smaller than 50 wt. %, there is a potential problem that the crystallinity of the polymer is reduced and its heat resistance is reduced correspondingly.

Exemplary recurring units other than the above recurring units may include:

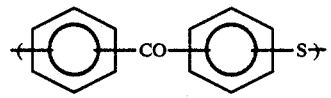

(except for the recurring unit in which the —CO— and —S— are in the para position to each other.);

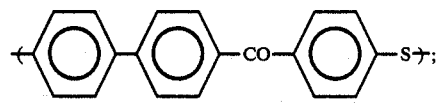

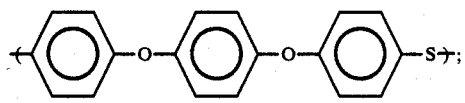

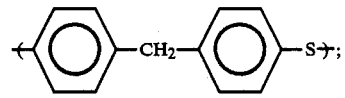

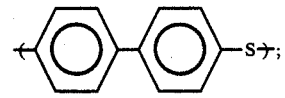

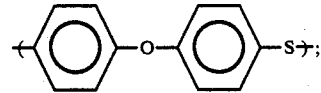

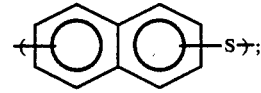

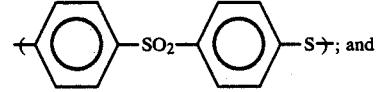

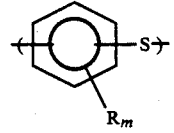

(wherein R means an alkyl group having 5 or less carbon atoms and m stands for an integer of 0–4.).

It is desirable that the melt-stable PTKs used in this invention are uncured polymers, especially, uncured linear polymers.

The term "cure" as used herein means a molecular-weight increasing treatment by a method other than a usual polycondensation reaction, for example, by a crosslinking, branching or molecular-chain extending reaction, particularly, a molecular-weight increasing treatment by a high-temperature heat treatment or the like. The term "uncured polymer" as used herein means a polymer not subjected to a post treatment such that curing is effected in an attempt of increasing the molecular weight of the polymer and increasing its melt viscosity. In general, "curing" causes a PTK to lose or decrease its melt stability and crystallinity.

PTKs having a partially crosslinked and/or branched structure to such an extent still allowing the application of conventional melt processing techniques are also acceptable as PTKs usable in the present invention. For example, PTKs obtained by conducting polymerization in the presence of a small amount of a crosslinking agent (e.g., polychlorobenzophenone, polybromobenzophenone or the like) and PTKs subjected to mild curing are acceptable as PTKs usable in this invention.

Physical properties of PTKs

The PTKs used in this invention may preferably have the following physical properties.

(a) As indices of their excellent heat resistance, their melting points, Tm range from 310° to 380° C.

(b) As indices of the melt stability of the polymers, their residual melt crystallization enthalpies, $\Delta Hmc$ (420° C./10 min) are at least 10 J/g, and their melt crystallization peak-temperature, Tmc (420° C./10 min) are at least 210° C.

(c) As indices of the molecular weights of the polymers, their reduced viscosities, $\eta_{red}$ should be within the range of 0.2-2 dl/g.

In the present invention, each reduced viscosity, $\eta_{red}$ is expressed by a value as determined by viscosity measurement at 25° C. and a polymer concentration of 0.5 g/dl in 98 wt. % sulfuric acid.

(d) As indices of the characteristics of highly-crystalline polymers, the densities of the polymers obtained in a crystallized form by annealing them at 280° C. for 30 minutes are at least 1.34 g/cm³ at 25° C.

Characteristic properties of the PTKs usable in this invention will next be described.

(1) Heat resistance:

The melting point, Tm of a polymer serves as an index of the heat resistance of the polymer.

The PTKs used in the present invention have a melting point, Tm of 310°–380° C., preferably 320°–375° C., more preferably 330°–370° C. Those having a melting point, Tm lower than 310° C. are insufficient in heat resistance. On the other hand, it is difficult to perform melt processing of those having a melting point, Tm higher than 380° C. without decomposition. Such an excessively low or high melting point is undesired.

(2) Melt stability:

The greatest feature of the PTKs used in this invention resides in that they have melt stability sufficient to permit the application of conventional melt processing techniques.

All the conventional PTKs have low melt stability and tend to be reduced in flowability, to lose their crystallinity or to undergo crosslinking or carbonization, resulting in a rapid increase in melt viscosity, upon their melt processing.

It is hence possible to obtain an index of the melt processability of a PTK by investigating the residual crystallinity of the PTK after holding it at an elevated temperature of its melt processing temperature or higher for a predetermined period of time. The residual crystallinity can be evaluated quantitatively by measuring the melt crystallization enthalpy with a differential scanning calorimeter (hereinafter abbreviated as "DSC"). Specifically, the residual melt crystallization enthalpy, $\Delta Hmc$ (420° C./10 min) and melt crystallization peak-temperature, Tmc (420° C./10 min) of the PTK which are determined at a cooling rate of 10° C./min after the PTK is held at 50° C. for 5 minutes in an inert gas atmosphere, heated to 420° C. at a rate of 75° C./min and then held for 10 minutes at 420° C. (higher than the melt processing temperature), can be used as measures of its melt stability. In the case of a PTK having poor melt stability, it undergoes crosslinking or the like at the above high temperature condition of 420° C. and loses its crystallinity substantially.

The melt-stable PTKs usable in this invention are polymers whose residual melt crystallization enthalpies, $\Delta Hmc$ (420° C./10 min) are preferably at least 10 J/g, more preferably at least 15 J/g, most preferably at least 20 J/g and whose melt crystallization peak-temperature, Tmc (420° C./10 min) are preferably at least 210° C., more preferably at least 220° C., most preferably at least 230° C. A PTK, whose $\Delta Hmc$ (420° C./10 min) is smaller than 10 J/g or whose Tmc (420° C./10 min) is lower than 210° C., tends to lose its crystallinity or to induce an abrupt melt viscosity increase upon its melt processing, so that difficulties are encountered upon application of conventional melt processing techniques.

(3) Molecular weight:

The molecular weight of a PTK, which is correlated to the melt viscosity of the PTK, is an important factor governing its melt processability. The solution viscosty, for example, reduced viscosity, $\eta_{red}$ of a polymer can be used as an index of its molecular weight.

In order to apply conventional melt processing techniques, high molecular-weight PTKs whose reduced viscosities, $\eta_{red}$ are preferably 0.2–2 dl/g, more preferably, 0.3–2 dl/g, most preferably 0.5–2 dl/g are desired.

Since a PTK whose $\eta_{red}$ is lower than 0.2 dl/g has a low melt viscosity and high tendency of drawdown, it is difficult to apply conventional melt processing techniques. Further, molded or formed products obtained from such a PTK are insufficient in mechanical properties. On the other hand, a PTK whose $\eta_{red}$ exceeds 2 dl/g is very difficult in production and processing.

(4) Crystallinity:

As an index of the crystallinity of a polymer, its density is used.

The PTKs employed in this invention are desirably polymers whose densities (at 25° C.) are preferably at least 1.34 g/cm³, more preferably at least 1.35 g/cm³ when measured in a crystallized form by annealing them at 28° C. for 30 minutes.

Those having a density lower than 1.34 g/cm³ have potential problems that they may have low crystallinity and hence insufficient heat resistance and their processability such as injection-moldability and mechanical properties of resulting molded or formed products may also be insufficient.

In particular, PTKs crosslinked to a high degree (e.g., the PTKs described in Publication A) have lost crystallinity and their densities are generally far lower than 1.34 g/cm³.

Production Process of PTKs

The melt-stable PTKs usable in the present invention can be produced, for example, by subjecting an alkali metal sulfide and a dihalogenated aromatic compound, preferably, dichlorobenzophenone and/or dibromobenzophenone to a dehalogenation or sulfuration reaction, for a short period of time, in the substantial absence of a polymerization aid (a salt of a carboxylic acid, or the like), in an aprotic polar organic solvent, preferably, an organic amide solvent (including a carbamic amide or the like) and in a system having a water content far higher compared with polymerization processes of the prior art while controlling the temperature profile suitably, and if necessary, by choosing the material of a reactor suitably.

Described specifically, the melt-stable PTK employed in the present invention can be produced suitably by subjecting an alkali metal sulfide and a dihalogenated aromatic compound consisting principally of 4,4'-dichlorobenzophenone and/or 4,4'-dibromobenzophenone to a dehalogenation or sulfuration reaction under the following conditions (a)–(c) in an organic amide solvent.

(a) ratio of the water content to the amount of the charged organic amide solvent being 2.5–15 (mole/kg);

(b) ratio of the amount of the charged dihalogenated aromatic compound to the amount of the charged alkali metal sulfide being 0.95–1.2 (mole/mole); and (c) reaction temperature being 60°–300° C. with a proviso that the reaction time at 210° C. and higher is within 10 hours.

The melt-stable PTK can be obtained more suitably when a reactor at least a portion of which, said portion being brought into contact with the reaction mixture, is made of a corrosion-resistant material such as a titanium material.

If desired, at least one halogen-substituted aromatic compound having at least one substituent group having electron-withdrawing property at least equal to —CO— group (preferably, 4,4'-dichlorobenzophenone and/or 4,4'-dibromobenzophenone employed as a monomer) may be added and reacted (as a stabilization treatment in a final stage of the polymerization) so as to obtain PTK improved still further in melt stability.

The melt-stable PTK employed in the present invention may preferably be an uncured polymer as described above. It may however be PTK in which a crosslinked structure and/or a branched structure has been incorporated to a certain minor extent. In order to obtain a PTK with a branched or crosslinked structure introduced therein, it is preferable to have a polyhalogenated compound, especially, a polyhalogenated benzophenone having at least three halogen atoms exist as a crosslinking agent in the polymerization reaction system in such an amount that the charge ratio of the monomeric dihalogenated aromatic compound to the polyhalogenated benzophenone ranges from 100/0 to 95/5 (mole/mole). If the charged amount of the polyhalogenated benzophenone is too much, physical properties of the resulting PTK, such as its melt processability, density and crystallinity, will be reduced. It is hence not preferable to charge such a polyhalogenated benzophenone too much.

Component B (Basic Compound)

The basic compound (Component B) used as a stabilizer in this invention is added to reduce or prevent the melt viscosity increase or decrease of crystallinity due to thermal modification and/or thermal deterioration, the sticking of thermal decomposition products at resin residence areas of melt processing equipment, etc. upon melt processing of PTK and constitutes the greatest feature of the present invention.

As already described above, the compounds known so far as stabilizers for PATE show little stabilizing effects for melt viscosity and crystallinity or have a potential problem of deteriorating them on the contrary when mixed with a melt-stable PTK. In addition, acidic inorganic materials, neutral inorganic materials and oxidative basic inorganic materials have little improving effects or have a potential problem of deterioration on the contrary.

As stabilizers effective for the improvement of the melt stability and decrease of crystallinity of a melt-stable PTK, non-oxidative, heat resistant, low volatile, basic compounds are mentioned.

As specific basic compounds, the hydroxides, oxides and aromatic carboxylic acid salts of Group IIA metals of the periodic table other than magnesium, the hydrocarbyl oxides, aromatic carboxylic acid salts, carbonates, hydroxides, phosphates (including condensation products) and borates (including condensation products) of Group IA metals of the periodic table, and basic double salts containing two or more of the above compounds may be mentioned as being highly effective.

From the viewpoint of improving the melt viscosity increase, decrease of crystallinity, sticking of thermal decomposition products to resin residence areas of melt processing equipment, etc., the hydroxides and oxides of calcium and barium as well as the lithium, sodium and potassium salts of aromatic carboxylic acids such as naphthalene monocarboxylic acid and polycarboxylic acids, arylbenzoic acids, benzene monocarboxylic acid and polycarboxylic acids and hydroxybenzoic acids are particularly preferred.

The proportion of Component B in the PTK composition of this invention may be within a range of 0.1–30 parts by weight, preferably 0.2–25 parts by weight, more preferably 0.3–20 parts by weight, all, per 100 parts by weight of Component A.

If the proportion of Component B is smaller than 0.1 part by weight, its stabilizing effects are insufficient. On the other hand, any proportions greater than 30 parts by weight involve a potential problem that PTK may be decomposed or other physical properties (for example, electrical properties or the like) may be deteriorated.

Component C (Thermoplastic Resin)

Each composition of this invention may be mixed with at least one of thermoplastic resins (Component C) in a proportion of 0–400 parts by weight, preferably 0.1–200 parts by weight, more preferably 1–90 parts by weight per 100 parts by weight of Component A, if desired.

If the proportion of Component C exceeds 400 parts by weight, there is a possible problem that the advantageous properties of the PTK, heat-resistant and crystalline thermoplastic resin, could be impaired substantially.

As exemplary thermoplastic resins useful in the present invention, may be mentioned resins such as poly(arylene thioethers), aromatic polyether ketones, e.g., PEEKs and PEKs, polyamides (including Aramids), polyamideimides, polyesters (including aromatic polyesters and liquid crystalline polyesters), polysulfones, polyether sulfones, polyether imides, polyarylenes, poly(phenylene ethers), polycarbonates, polyester carbonates, polyacetals, fluoropolymers, polyolefins, polystyrenes, polymethyl methacrylate, and ABS; as well as elastomers such as fluororubbers, silicone rubbers, olefin rubbers, acrylic rubbers, polyisobutylenes (including butyl rubber), hydrogenated SBR, polyamide elastomers and polyester elastomers.

Among these thermoplastic resins are preferred poly(arylene thioethers), aromatic polyether ketones, Aramids, aromatic polyesters, liquid crystalline polyesters, polysulfones, polyether sulfones, polyether imides and fluoropolymers.

These thermoplastic resins may be used either singly or in combination.

Among the above-exemplified thermoplastic resins, poly(arylene thioethers), especially, poly(arylene thioethers) having predominant recurring units of the formula

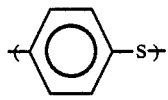

(said recurring units accounting for at least 50 wt. %) can improve the mechanical properties of the PTK compositions over those of the PTK alone and the heat resistance of the PTK compositions over those of poly(arylene thioethers) alone when blended with the melt-stable PTK, and compositions well-balanced in heat resistance, mechanical properties and flow characteristics can be obtained.

Component D (Filler)

Each composition of the present invention may contain, if desired, at least one of fibrous fillers and/or at least one of inorganic fillers (Component D) in a proportion of 0-400 parts by weight, preferably 1-300 parts by weight, more preferably 10-200 parts by weight, per 100 parts by weight of the sum of resin components (Component A+Component C).

If the proportion of Component D exceeds 400 parts by weight, there is a potential problem that the processability may be reduced. Such a large proportion is therefore not preferred.

As exemplary inorganic fillers (other than Component B), may be mentioned talc, mica, kaolin, clay, silica, alumina, silica-alumina, titanium oxide, iron oxides, chromium oxide, calcium silicate, calcium phosphate, calcium sulfate, calcium carbonate, magnesium oxide, magnesium hydroxide, magnesium carbonate, barium sulfate, magnesium phosphate, silicon, carbon (including carbon black), graphite, silicon nitride, molybdenum disulfide, glass, hydrotalcite, ferrite, samarium-cobalt, neodium-iron-boron, etc., all, in a powder form.

As exemplary fibrous fillers, may be mentioned fibers such as glass fibers, carbon fibers, graphite fibers, silica fibers, alumina fibers, zirconia fibers, silicon carbide fibers and Aramid fibers; as well as whiskers such as potassium titanate whiskers, calcium silicate (including wollastonite) whiskers, calcium sulfate whiskers, carbon whiskers, silicon nitride whiskers and boron whiskers. Among these fibrous fillers, fibers such as glass fibers, carbon fibers and Aramid fibers are preferred from the viewpoints of physical properties and/or economy.

These inorganic fillers and fibrous fillers may be used either singly or in combination.

Each PTK composition of the present invention may also be added with small amounts of additives such as light stabilizers, rust inhibitors, lubricants, surface-roughening agents, nucleating agents, mold releasing agents, colorants, coupling agents, flashing preventives and/or antistatic agents.

Properties of Compositions (1) Melt stability:

The extent of a variation of the melt viscosity of a polymer at its melt processing temperature can be used as an index of its melt stability.

When a thermoplastic polymer is maintained at a high temperature, it is generally observed that its melt viscosity decreases or on the contrary, increases due to decomposition or a crosslinking reaction or the like. When a conventional melt processing technique is applied, it is highly desired that the variation of the melt viscosity is small.

Conventional PTKs having poor melt stability exhibit an abrupt increase in melt viscosity in a short period of time due to a crosslinking reaction and in some instances, are carbonized when maintained at high temperatures above their melting points respectively.

On the other hand, the melt-stable PTK (Component A) employed in this invention has been improved significantly in melt stability over conventional PTKs and the increase of its melt viscosity is hence far slower. Moreover, the addition of the stabilizer (Component B) in this invention, which is composed of a basic compound, can prevent or reduce the increase further.

The effects of the basic compound (Component B) cannot however be developed with conventional PTKs of poor melt stability. Even when the basic stabilizer useful in the practice of this invention is added to poly(arylene thioethers) (PATEs) other than PTKs, for example, poly(p-phenylene thioether), the melt stability is not improved but is deteriorated on the contrary.

Variations in melt viscosity will be expressed by a ratio $\eta_{60}^*/\eta_5^*$ in which $\eta_5^*$ is a melt viscosity of a resin composition as measured at a shear rate of 1200 sec$^{-1}$ by a Capirograph (manufactured by Toyo Seiki Seisaku-Sho, Ltd.) after holding the resin composition at 385° C. for 5 minutes and $\eta_{60}^*$ is a melt viscosity of the resin composition as measured at a shear rat of 1200 sec$^{-1}$ by the Capirograph after holding the resin composition at 385° C. for 60 minutes.

The poly(arylene thioether-ketone) compositions of improved melt stability and crystallinity according to this invention, which mean blends of Component A and Component B here, may preferably have of $\eta_{50}^*/\eta_5^*$ of from 0.5 (inclusive) to 10 (inclusive), preferably from 0.6 (inclusive) to 8 (inclusive), more preferably from 0.7 (inclusive) to 7 (inclusive). If $\eta_{60}^*/\eta_5^*$ is greater than 10, the improvements in melt viscosity are dissatisfactory so that the prolongation of the longrun time of melt processing cannot be expected too much.

(2) Decrease of crystallinity:

The crystallinity of a crystalline polymer can be evaluated by melt crystallization enthalpy ΔHmc and density. Accordingly, the degree of decrease of crystallinity can be determined by the degree of decrease of ΔHmc, i.e., Δ(ΔHmc), the degree of decrease of density, etc. For the sake of convenience, the degree of decrease of crystallinity will be evaluated in terms of Δ(ΔHmc) in this invention.

Incidentally, a value of Δ(ΔHmc) in this invention means the difference between ΔHmc (420° C./10 min) of an extrudate melt-extruded from a PTK or powder of its composition into strands under conditions of a cylinder temperature of 385° C. and an average residence time of 1 minute for the resin in a cylinder and ΔHmc (420° C./10 min) of powder of the PTK alone free of any basic compound.

Since a decrease of crystallinity is induced by heat history, the degree of a decrease of crystallinity of a PTK due to its heat history from a powdery state until it is pelletized by melting and kneading is evaluated quantitatively by determining the difference Δ(ΔHmc) between ΔHmc of the melt extrudate (pellets) and ΔHmc of the starting powdery PTK.

A PTK (Component A) has such properties that its ΔHmc generally decreases when subjected to melt extrusion. The decrease can however be either prevented or reduced by adding a basic compound (Component B) useful in the practice of this invention. As a composition of this invention prevented or reduced in decrease of crystallinity (so long as a blend of Component A and Component B is concerned), the degree of decrease of ΔHmc (420° C./10 min) upon melt extrusion, i.e., Δ(ΔHmc) may be smaller than 25 J, preferably 20 J or smaller, more preferably 15 J or smaller. Compositions having Δ(ΔHmc) of at least 25 J, may not have fully-prolonged long-run time upon their melt processing and may not be able to provide molded products having physical properties, such as heat resistance, improved owing to improved degrees of crystallization.

Mixing Method

Among PTK compositions of this invention improved in melt stability and decrease of crystallinity, compositions formed of Component A and Component B can be prepared by a dry blending method in which Component B in the form of dry powder is added to Component A, or by a wet method in which Component B in a wet form such as a solution or a slurry is added to Component A and a solvent is then removed to dry the resultant mixture. These mixtures can be separately molten and kneaded further to provide molten and kneaded mixtures.

Dry blending is generally preferred in view of its convenience that no drying step is required. When other components, namely, Component C, Component D and other aids are added to the above composition, they may be added to the mixture of Component A and Component B, they may be added to Component A at the same time as the addition of Component B, or they may be added to Component A prior to the addition of Component B. In this case, their mixing may be carried out in the same manner as the above-described mixing method of Component B.

Melt-Molded or Formed Products

Each PTK composition according to this invention can be formed into a melt-molded or formed product by its melt processing.

The melt-molded or formed product can be obtained by applying a conventional melt-processing technique, namely, a melt-processing technique such as extrusion, injection molding or melt spinning to the PTK composition improved in melt stability and decrease of crystallinity. A molded or formed PTK product can also be obtained by the secondary processing or tertiary processing, such as stretching or thermoforming, of the formed or molded product.

Extruded products

An extruded product of a PTK composition can be produced, for example, by feeding the PTK composition to an extruder equipped with a shaping die or nozzle in the surrounding atmosphere, or more preferably, in an inert gas atmosphere, extruding and shaping the PTK composition under conditions of a cylinder temperature of 320°–450° C. and an average resin residence time of 0.5–60 minutes, more preferably, 2–30 minutes in a cylinder, and if necessary, annealing the extrudate at 200°–370° C. for 0.1–100 hours.

Incidentally, the extruder employed here may preferably be made of a non-ferrous corrosion resistant metal at areas where the extruder is brought into contact with the molten resin. A vented extruder is more preferred.

Injection-molded products

An injection-molded product of the PTK composition may be produced, for example, by feeding the PTK composition to an injection molding machine equipped with a mold in the surrounding atmosphere, or more preferably, in an inert gas atmosphere, injection-molding the PTK composition under molding conditions of a cylinder temperature of 320°–450° C., a mold temperature of 50°–250° C., an average resin residence time of 1–3,000 seconds, more preferably, 3–1,000 seconds in a cylinder, an injection holding pressure of $10-10^4$ kg/cm$^2$ and an injection molding cycle of 1–3,000 seconds, and if necessary, annealing the injection-molded product at 200°–370° C. for 0.1–100 hours.

Incidentally, the injection molding machine employed here may preferably be made of a non-ferrous corrosion resistant metal at areas where the extruder is brought into contact with the molten resin. A vented injection-molding machine is more preferred.

Fibrous products

A fibrous product can be obtained, for example, by feeding the PTK composition improved in melt stability and decrease of crystallinity to an extruder equipped with a melt-spinning nozzle in the surrounding atmosphere, or more preferably, in an inert gas atmosphere, extruding the PTK composition in a molten state through the nozzle, taking up the resulting filaments at a draw down ratio, $R_1$ (the ratio of the take-up speed of spun filaments to the discharge speed of the resin from the nozzle) of 1–1,000 times, stretching the thus-obtained filaments at 120°–200° C. to a draw ratio of 1.2–8 times, and then heat setting the thus-stretched filaments at 130°–370° C. for 0.1–1,000 seconds.

Incidentally, the spinning extruder employed here may preferably be made of a non-ferrous corrosion resistant metal at areas where the extruder is brought into contact with the molten resin. A vented spinning extruder is more preferred.

Film-like products

A film-like product can be obtained, for example, by feeding the PTK composition improved in melt stability and decrease of crystallinity to an extruder equipped with a T-die in the surrounding atmosphere, or more preferably, in an inert gas atmosphere, extruding the PTK composition in a molten state into a film (T-die extrusion) or pressing the PTK composition into a film while heating and melting it on a high-temperature press (hot pressing), heat setting the thus-formed film at a temperature of 200° C. or higher but lower than the melting point of the PTK for 1–3,000 seconds while applying a stress (pressure) to control its deformation within ±20%, and if necessary, subjecting the resultant film to thermal relaxation at 200°–360° C., for 1–3,000 seconds, substantially under no stress.

Incidentally, the T-die extruder employed here may preferably be made of a non-ferrous corrosion resistant metal at areas where the extruder is brought into contact with the molten resin. A vented T-die extruder is more preferred.

A film-like product can also be obtained from the PTK composition by inflation or compression molding method. From the PTK composition, multi-layer films combined further with various thermoplastic resins or thermosetting resins can also be obtained.

Other melt-molded and formed products

From the PTK composition improved in melt stability and decrease of crystallinity, molded or formed hollow products such as bottles, tanks, pipes or tubes can be obtained by blow molding. Elongated formed products such as plates, pipes, tubes, rods or profiles can also be obtained from the PTK composition by pultrusion.

Secondary and tertiary processing of molded or formed products

An amorphous film-like product can be obtained, for example, by feeding the PTK composition to an extruder equipped with a T-die or ring die in the surrounding atmosphere, preferably, in an inert gas atmosphere, extruding the PTK composition in a molten state into a film and then quenching the film (T-die extrusion or inflation) or by pressing the PTK composition into a film while heating and melting it on a high-temperature press and then quenching the film (hot pressing). A stretched film can then be obtained from the amorphous film-like product by uniaxially or biaxially stretching it at 100°–180° C. to a draw ratio of 1.5–7 times in each direction (either sequentially or simultaneously in the case of biaxial stretching) with rolls, a tenter or the like, heat setting the thus-stretched film for 1–3,000 seconds while applying a stress (tensile force) to control its deformation within ±20%, and if necessary, subjecting the resultant film to thermal relaxation at a temperature of 200° C. or higher but lower than the melting point of the PTK, for 1–3,000 seconds, substantially under no stress.

Incidentally, the T-die extruder employed here may preferably be made of a non-ferrous corrosion resistant metal at areas where the extruder is brought into contact with the molten resin. A vented T-die extruder is more preferred. A high-lubricity film whose coefficient of surface dynamic friction is 0.7 or smaller (as measured against another high-lubricity film of the same type at 25° C. in accordance with ASTMD-1894) can be obtained, (i) by forming a composition, which has been obtained by adding a small amount of fine powder of a solid (calcium carbonate, kaolin, alumina, silica, titanium oxide, clay or the like) to a PTK composition, into a film, (ii) by treating at least one side of a film-like product, which has been obtained from a PTK composition of this invention, with an organic solvent having high affinity with PTK and then stretching the thus-treated film-like product, (iii) by roughening at least one side of a stretched film, which has been obtained from a PTK composition of this invention, by sand-blasting or a surface-roughening roll, or (iv) by other methods.

Various molded or formed products can also be obtained from each PTK composition of this invention improved in melt stability and decrease of crystallinity by secondary and tertiary processings such as thermoforming or stretching.

Application Fields

Each PTK composition of this invention improved in melt stability and decrease of crystallinity can provide various molded or formed products suitable for various applications in accordance with conventional melt processing techniques.

Injection-molded products may be used, for example, as various electronic and electric parts (circuit boards, sealants for electronic parts, connectors, etc.), car parts (various parts installed around engines), precision parts (parts for cameras, watches, clocks, etc.), plastic magnets, sealants, sliding members, friction materials, food packages, cooking utensiles, etc.

Extrusion, blow-molded and pultrusion products may be used, for example, as sheets and plates (stampable sheets, trays, etc.), pipes and tubes (pipings for the chemical industry, warm/hot water pipings, pipes for electric wires and cables, etc.), heat-resistant covered conductors, blow bottles, rods, profiles, etc.

Those formed into a fibrous shape may be used, for example, as industrial filters, heat-insulating materials, reinforcing fibers, insulating tapes, insulating cloths, fireproof wears, high-temperature gloves, prepreg fibers, prepreg tapes, tension members for optical fiber cables, infusible fibers, carbon fibers, various textiles, etc.

Those formed into a film-like shape may be used, for example, as base films for magnetic recording materials (especially, including films for vacuum deposition or sputtering and films for magnetic recording films of the perpendicular magnetization type), films for capacitors (films for chip-type capacitors, in particular), printed circuit boards (including both flexible and rigid types), insulating films, printer tapes, stampable sheets, various trays, containers, separation membranes, filtration membranes, ion-exchange membranes, etc.

ADVANTAGES OF THE INVENTION

The PTK compositions of this invention are resin compositions improved significantly in decrease of crystallinity, melt viscosity variation and the like, which take place due to thermal modification and thermal deterioration of PTK upon melt processing. It has hence become feasible to prolong the long-run time of melt processing considerably and to shorten the molding cycle time of injection molding to a significant extent, thereby making it possible to achieve a significant reduction in the cost of melt processing.

In addition, the degree of crystallization of a melt-molded or formed product has been increased. As a result, it has become feasible to improve significantly physical properties of the resulting molded or formed product, such as heat resistance and mechanical properties.

The sticking of thermal decomposition products to surfaces of a melt processing equipment, where the equipment is brought into contact with the molten resin, has been reduced, whereby the cleaning of a processing equipment has been rendered easy.

EMBODIMENTS OF THE INVENTION

The present invention will hereinafter be described specifically by the following Examples, Experiments and Comparative Examples. It should however be borne in mind that the present invention is not limited to the following Examples and Experiments so long as it does not depart from the subject matter.

EXPERIMENTS

Synthesis Experiment 1: (Synthesis of Melt-Stable PTK)

A titanium-lined reactor was charged with 90 moles of 4,4'-dichlorobenzophenone (hereinafter abbreviated as "DCBP"; product of Ihara Chemical Industry Co., Ltd.), 90 moles of hydrated sodium sulfide (water content: 53.6 wt. %; product of Sankyo Kasei Co., Ltd.) and 90 kg of N-methylpyrrolidone (hereinafter abbreviated as "NMP") (water content/NMP=5.0 moles/kg). After the reactor being purged with nitrogen gas, the resultant mixture was heated from room temperature to 240° C. over 1.5 hours and then maintained at 240° C. for 1.5 hours. In order to apply the stabilization treatment in the final stage of the polymerization, the reaction mixture was then heated to 260° C. over 0.5 hour while charging under pressure a mixture composed of 9.0 moles of DCBP, 18 kg of NMP and 90 moles of water. The resultant mixture was maintained further at 260° C. for 1.0 hour to react them.

After completion of the reaction, the valve of the reactor was opened and the contents were drawn out of the reactor while flashing it. A substantial portion of the solvent was therefore caused to evaporate. The thus-obtained solvent-containing mixture was fed to a small rotary dryer. While causing nitrogen gas to flow, the mixture was gradually heated up to distill out most of the solvent.

A solid thus obtained was ground in a mill, washed with chloroform, washed with acetone and then dispersed in water, whereby components soluble in water (consisting mainly of sodium chloride) was leached and removed. The resulting solid was collected by filtration, washed with acetone, washed with chloroform, washed with acetone, washed with hot water, and then collected by filtration, thereby obtaining a wet polymer. The thus-obtained wet polymer was dried at 80° C. for 12 hours under reduced pressure, so that Polymer P1 was obtained as an ivory powder.

Synthesis Experiment 2: (Synthesis of Conventional PTK)

A reactor made of SUS 316 (Stainless Steel Type as prescribed in the ASTM) was charged with 10 moles of sodium sulfide nonahydrate, 5.0 l of NMP and 10 moles of lithium acetate. The resultant mixture was heated up to 200° C. under a nitrogen gas stream to remove water therefrom, whereby 1580 g of distilled aqueous solution containing 104 g of NMP was obtained.

After cooling the reaction system to 120° C., a solution formed of 10 moles of DCBP and 0.8 l of NMP was charged (water content/NMP=1.4 moles/kg). The thus-obtained mixture was maintained, under stirring and nitrogen gas pressure, at 230° C. for 2 hours and then at 250° C. for 1 hour so as to react them. After the polymerization reaction, the reaction mixture in the form of a slurry was poured into water. A polymer thus precipitated was washed with water and acetone separately and repeatedly, and was then dried to obtain Polymer P2 as a brown powder.

A portion of Polymer P2 was heated at 250° C. for 2 hours in air, thereby obtaining cured Polymer CP2 as a black powder.

Synthesis Experiment 3: (Synthesis of Conventional PTK)

A reactor made of SUS 316 was charged with 1.0 mole of sodium sulfide trihydrate, 800 ml of NMP and 1.0 g of sodium hydroxide. The resulting mixture was heated up to 210° C., whereby 42 g of distilled water containing 3 g of NMP was obtained. The residue was then cooled to about 45° C.

Under vigorous stirring, 1.0 mole of 4,4'-difluorobenzophenone and 0.033 mole of sodium sulfite were added (water content/NMP=0.9 mole/kg). The reaction system was pressurized to 5 atm with nitrogen gas, and the contents were maintained at 250° C. for 4 hours to polymerize them. After the reaction, the reactor was cooled to 100° C., and the reaction mixture in the form of a slurry was taken out. The resulting polymer was separated and then washed with hot water and acetone separately and repeatedly. After sufficient washing of the polymer, it was dried fully to obtain Polymer P3 as a yellowish brown powder.

Synthesis Experiment 4: (Synthesis of Conventional PTK)

In a flask, 0.804 mole of 4-(4-chlorobenzoyl)thiophenol, 45.1 g (114.5 g/mole solution) of an aqueous solution of potassium hydroxide, 300 g of 1,1-dioxothiolan and 300 g of diphenyl sulfone were heated for 3 hours under reduced pressure (15 Torr).

The reaction mixture was heated from 20° C. to 260° C. to remove the resultant water and 1,1-dioxothiolan, whereby the reaction mixture turned to a solid (the water content was practically 0). The mixture was cooled and then heated at 350° C. for 3 hours in a nitrogen gas atmosphere. The mixture turned to a liquid at about 340° C. The mixture was cooled and solidified. It was taken out of the flask, ground and extracted four times with 4 l of hot methanol, twice with 4 l of hot water and once again with 4 l of hot methanol, and then dried to obtain Polymer P4 as a yellow powder.

Synthesis Experiment 5: (Synthesis of Conventional PTK)

Ten moles of DCBP were dissolved in 30 kg of dimethylformamide (hereinafter abbreviated "DMF").

Ten moles of sodium sulfide nonahydrate were charged in a reactor made of SUS 316, followed by an addition of the above-prepared solution (water content/DMF=3 moles/kg). After the reactor being purged with nitrogen gas, they were reacted at about 175° C. for 27 hours. The thus-obtained reaction mixture was washed 5 times with hot water and 5 times with DMF, thereby obtaining Polymer P5 as a yellow powder.

Incidentally, Polymers P2, CP2 (cured form), P3, P4 and P5 were prepared by following the processes disclosed in Publications A, A, B, C and D respectively. They were provided as exemplary PTKs according to the prior art.

Measurement of melting points

With respect to each of the PTKs thus obtained, the melting point, Tm was measured as an index of its heat resistance. The measurement was performed in the following manner. About 10 mg of each PTK (powder) was weighed. The sample was held at 50° C. for 5 minutes in an inert gas atmosphere, then heated up at a rate of 10° C./min so as to measure its melting point on a DSC (Model TC 10A; manufactured by Metler Company).

Results are collectively shown in Table 1.

Measurement of residual melt crystallization enthalpies

With respect to each of the PTKs polymerized above, the residual melt crystallization enthalpy, ΔHmc (420° C./10 min) was measured as an index of its melt stability. Namely, the temperature corresponding to a peak of melt crystallization measured by the DSC is represented by Tmc (420° C./10 min) and the quantity of heat converted from the area of the peak was taken as residual melt crystallization enthalpy, ΔHmc (420° C./10 min). Described specifically, about 10 mg of each PTK (powder) was weighed. After holding the PTK at 50° C. for 5 minutes in an inert gas atmosphere by a DSC, it was heated at a rate of 75° C./min up to 420° C. and held at that temperature for 10 minutes. While cooling the PTK at a rate of 10° C./min, its ΔHmc (420° C./10 min) and Tmc (420° C./10 min) were measured thereafter. Results are collectively shown in Table 1.

that abrupt increases in extrusion torque were observed. They hence provided only melt-extrusion products which were locally carbonized and/or foamed.

In order to evaluate the melt formability of the thus-obtained melt-extrusion products of the PTK compositions added with the basic stabilizer, sheet-like products were next melt-formed separately from the individual melt-extrusion samples and their densities were measured.

An extrudate sample of each Ca(OH)$_2$-added PTK was first of all placed between two sheets of polyimide film ("Kapton", trade mark; product of E.I. du Pont de Nemours & Co., Inc.). It was preheated at 385° C. for 2 minutes and then press-formed at 385° C. for 0.5 minute by a hot press. It was then quenched to obtain an amorphous sheet whose thickness was about 0.15 mm.

A part of the amorphous sheet was used directly as a sample, while the remaining part was annealed at 280° C. for 30 minutes to use it as an annealed sample with an increased degree of crystallization. Their densities were measured at 25° C. by means of a density gradient tube

TABLE 1

| Polymer No. | P1 | P2 | CP2 | P3 | P4 | P5 |
|---|---|---|---|---|---|---|
| Heat resistance (powdery polymer) Tm (°C.) | 357 | 335 | 331 | 365 | 355 | 330–360[1] |
| Melt stability (powdery polymer) | | | | | | |
| ΔHmc (420° C./10 min) (J/g) | 56 | 0 | 0 | 0 | 0 | 0 |
| Tmc (420° C./10 min) (°C.) | 303 | ND[2] | ND[2] | ND[2] | ND[2] | ND[2] |
| Remarks | Example | Conventional PTK Comp. Ex. | Conventional PTK (cured) Comp. Ex. | Conventional PTK Comp. Ex. | Conventional PTK Comp. Ex. | Conventional PTK Comp. Ex. |

[1]Instable plural melting-point peaks were observed, probably, due to decomposition.
[2]ND: Not detected.

Melt processing test

In order to evaluate the melt extrudability of PTK compositions mixed with a basic inorganic material, 100 parts by weight of each of the PTKs obtained by the above polymerization was added with 0.5 part by weight of calcium hydroxide Ca(OH)$_2$. They were dry-blended using a tumbler blender. The resulting mixture was charged into a single-screw extruder having a cylinder diameter of 19 mm and an L/D ratio of 25, molten and kneaded at a cylinder temperature of 375° C. and then extruded into strands to observe its melt extrudability. At the same time, the strands were cooled and then ground to obtain an extrudate sample. PTK compositions of Polymers P2, CP2, P3, P4 and P5, which were conventional PTKs, underwent a decomposition or crosslinking reaction upon their melt extrusion, so (lithium bromide/water). Results are given in Table 2.

From the extrudate of each of the compositions of Polymers P2, CP2, P3, P4 and P5 which were conventional PTKs, it was only possible to obtain a defective sheet which was foamed and/or carbonized locally. On the other hand, a pale sheet of smooth external appearance was obtained from the extrudate sample which was made of the composition of Polymer P1 and had general melt processing applicability.

Results are shown collectively in Table 2.

As is apparent from Table 2, Polymers P2, CP2, P3, P4 and P5 had very poor melt extrudability even after the addition of the basic stabilizer Ca(OH)$_2$. In addition, the sheet-like products prepared respectively from the extrudates had an extremely low density and were uneven.

TABLE 2

| Polymer No. | P1 | P2, CP2, P3, P4, P5 |
|---|---|---|
| [PTK composition] | | |
| Melt extrudability of composition | Superb | Very poor |
| Density of melt-formed sheet: | | |
| Amorphous (g/cm$^3$) | 1.30 | 1.27–1.30[1] |
| Annealed (g/cm$^3$) | 1.35 | 1.29–1.31[1] |
| Melt formability | Superb | Very poor |
| [PTK] | | |
| Density of melt-formed sheet:[2] | | |
| Amorphous (g/cm$^3$) | 1.30 | 1.27–1.30[1] |
| Annealed (g/cm$^3$) | 1.35 | 1.29–1.31[1] |
| Remarks | Example | Conventional PTKs |

TABLE 2-continued

| Polymer No. | P1 | P2, CP2, P3, P4, P5 |
|---|---|---|
| | | Comparative Example |

[1] The density of each sample varied considerable from a portion to another due to foaming or the like.
[2] Densities were measured according to the same method for the melt-formed sheets of PTK compositions.

As to PTK Polymer P1 having good melt processability, its solution viscosity (reduced viscosity, $\eta_{red}$) was measured as an index of its molecular weight. Namely, the PTK powder was dissolved in 98 wt. % sulfuric acid to give a polymer concentration of 0.5 g/dl. The reduced viscosity of the resultant solution was then measured at 25° C. by means of a Ubbellohde viscometer. $\eta_{red}$ was 0.82 dl/g.

Improvements to melt stability and decrease of crystallinity by the addition of a stabilizer Regarding Polymer P1 whose melt extrudability and melt formability had been found good, effects of various stabilizers for the improvement of the melt stability and decrease of crystallinity of Polymer P1 were investigated by adding the various stabilizers to Polymer P1.

Namely, portions of Polymer P1 were added respectively with dry powders of various stabilizers. The resulting mixtures were separately blended in a tumbler blender, charged into a single-screw extruder having a cylinder diameter of 19 mm and an L/D ratio of 25, molten and kneaded at a cylinder temperature of 385° C. for an average residence time of 1 minute in the cylinder, extruded into strands, cooled, and then chopped, thereby preparing pellet samples of the stabilizer-added compositions respectively. Portions of the samples were used as samples for the evaluation of melt stability and decrease of crystallinity.

The evaluation of the melt stability of the individual pellet sample of each stabilizer-added composition was conducted in the following manner. Namely, about 20 g of the pellets were placed in a barrel of a Capirograph which had been heated to 385° C. The melt viscosity was measured 5 minutes, 30 minutes and 60 minutes later, thereby determining $\eta_5^*$, $\eta_{30}^*$ and $\eta_{60}^*$ (all, at a shear rate of 1200 sec$^{-1}$). With respect to the conventional PTK polymers, similar measurements were also attempted using the samples obtained in the melt processing test. Results of $\eta_{30}^*/\eta_5^*$ and $\eta_{60}^*/\eta_5^*$, which serve as indices of their melt stability are shown collectively in Table 3.

The evaluation of decrease of crystallinity upon melt processing of each stabilizer-added composition was conducted in the following manner. Namely, with respect to pellets of each stabilizer-added composition, ΔHmc and Tmc were measured in the same manner as in the measurement of the residual melt crystallization enthalpies of powdery PTKs. Those values were compared respectively with ΔHmc and Tmc of powder of Polymer P1. From their differences Δ(ΔHmc) and ΔTmc, effects of the stabilizer for the improvement of decrease of crystallinity of Polymer P1 due to its thermal history until pelletized by melting and kneading were evaluated.

Results except for Tmc and Δ(Tmc) are shown collectively in Table 3.

Certain kinds of basic compounds have been found to show marked effects for the improvement of the melt stability and decrease of crystallinity.

As is readily envisaged from Table 3, the melt stability of composition not added with any basic compound (Run No.1) had $\eta_{60}^*/\eta_5^*$ of at least 10, thereby indicating that a crosslinking reaction took place within 60 minutes and the melt viscosity hence increased. Furthermore, stuck decomposition products were observed at some areas in the barrel of the Capirograph. On the other hand, the composition added with 0.5 parts by weight of Ca(OH)$_2$ by way of example (Run No.2) had $\eta_{60}^*/\eta hd 5^*$ of 1.3 so that the melt stability of the Ca(OH)$_2$-added composition was improved significantly and the sticking of decomposition products to the barrel was improved considerably.

As is also apparent from Table 3, each composition added with no or little basic compound had a melt enthalpy reduction Δ(ΔHmc) of 25 J/g or greater but the composition added, for example, with 0.5 part by weight of Ca(OH)$_2$ (Run No.2) had Δ(ΔHmc) of 6 J/g. Accordingly, decrease of crystallinity of the Ca(OH)$_2$-added composition had been improved significantly.

Addition of a basic compound to poly(arylene thioether) containing no ketone groups 0.5 Part by weight of the basic compound Ca(OH)$_2$ was added to 100 parts by weight of poly(p-phenylene thioether) as a poly(arylene thioether) containing no ketone groups in its molecule (inherent viscosity, $\eta hd$ inh: 0.48 at 208° C. and a polymer concentration of 0.4 g/dl in 1-chloronaphthalane). As in the case of PTK, poly(p-phenylene thioether) and the above mixture were separately melt-extruded, thereby obtaining pellet samples (the melt-extrusion was conducted at 320° C.). With respect to each pellet sample, its melt viscosities $\eta_5^*$, $\eta_{30}^*$ and $\eta_{60}^*$ after holding it at 310° C. for 5 minutes, 30 minutes and 60 minutes respectively were measured by using a Capirograph.

As a result, $\eta_{30}^* /\eta hd 5^*$ and $\eta_{60}^*/\eta_5^*$ of the pellets extruded without the addition of the stabilizer were 0.8 and 0.6 respectively. On the other hand, $\eta_{30}^*/\eta_5^*$ and $\eta_{60}^*/\eta_5^*$ of the pellets added with the stabilizer were 0.5 and 0.35 respectively.

Namely, by the addition of the basic compound, the melt viscosity decreased to the considerable extent, and the melt stability was not improved but was deteriorated on the contrary.

TABLE 3

| Run No. | 1 | 2 | 3 | 4 | 5 | 6 | 7 | 8 | 9 |
|---|---|---|---|---|---|---|---|---|---|
| Composition | | | | | | | | | |
| PTK (P1) (parts by weight) | 100 | 100 | 100 | 100 | 100 | 100 | 100 | 100 | 100 |
| Stabilizer | — | Ca(OH)$_2$ | Ca(OH)$_2$ | CaO | Li$_2$CO$_3$ | LiOH | Sodium pyrophosphate | Sodium tetraborate | Mg(OH)$_2$ |
| (part by weight) | | 0.5 | 40 | 0.5 | 0.5 | 0.5 | 0.5 | 0.5 | 0.5 |
| Melt stability | | | | | | | | | |
| $\eta_{30}^*/\eta_5^*$ [2] | 2.3 | 1.0 | — | 1.0 | 1.1 | 1.5 | 1.6 | 1.4 | 1.9 |
| $\eta_{60}^*/\eta_5^*$ [2] | 11.0 | 1.3 | — | 1.8 | 1.9 | 6.0 | 8.5 | 6.3 | 11.5 |
| Crystallinity improving effects | | | | | | | | | |
| PTK powder $\Delta$Hmc (420° C./10 min) (J/g) | 56 | | | | | | | | |
| Pellets $\Delta$Hmc (420° C./10 min) (J/g) | 31 | 50 | — | 48 | 40 | 35 | 35 | 36 | 30 |
| Difference [3], $\Delta(\Delta$Hmc) (J/g) | 25 | 6 | — | 8 | 21 | 21 | 20 | 26 | |
| Remarks | No addition of stabilizer (Control) (Comp. Ex.) | (Example) | Added with excessive stabilizer. (Comp. Ex.) | (Example) | (Example) | (Example) | (Example) | (Example) | (Comp. Ex.) |

| Run No. | 10 | 11 | 12 | 13 | 14 | 15 | 16 | 17 |
|---|---|---|---|---|---|---|---|---|
| | | | | | | | | Conventional PTK |
| Composition | | | | | | | | |
| PTK (P1) (parts by weight) | 100 | 100 | 100 | 100 | 100 | 100 | 100 | 100 |
| Stabilizer | Na$_2$O$_2$ | NaCl | NH$_4$Cl | Ca(OH)$_2$ | lithium phenolate | lithium naphthoate | calcium phenylbenzoate | Ca(OH)$_2$ |
| (part by weight) | 0.5 | 0.5 | 0.5 | 0.02 | 0.3 | 0.5 | 1.0 | 0.5 |
| Melt stability | | | | | | | | |
| $\eta_{30}^*/\eta_5^*$ [2] | — | 2.4 | — | 2.0 | 1.1 | 1.1 | 1.2 | — |
| $\eta_{60}^*/\eta_5^*$ [2] | — | 13.0 | — | 11.0 | 3.3 | 3.0 | 3.5 | — |
| Crystallinity improving effects | | | | | | | | |
| PTK powder $\Delta$Hmc (420° C./10 min) (J/g) | | | | | | | | |
| Pellets $\Delta$Hmc (420° C./10 min) (J/g) | — | 29 | — | 31 | 47 | 48 | 44 | — |
| Difference [3], $\Delta(\Delta$Hmc) (J/g) | — | 27 | — | 25 | 9 | 8 | 12 | — |
| Remarks | Oxidizing [1] agent (Comp. Ex.) | Neutral salt (Comp. Ex.) | Acidic [1] salt (Comp. Ex.) | Added with very little stabilizer (Comp. Ex.) | (Example) | (Example) | (Example) | Measurement infeasible (Comp. Ex.) |

[1] Preparation of pellets was stopped due to decomposition, foaming, increased torque, etc. upon preparation of the pellets.
[2] $\eta_5^*$, $\eta_{30}^*$ and $\eta_{60}^*$ are melt viscosities when held at 385° C. for 5 minutes, 30 minutes and 60 minutes respectively. The smaller the ratios, the better the melt stability.
[3] Difference between $\Delta$Hmc (420° C./10 min) of powder of PTK alone and $\Delta$Hmc (420° C./10 min) of pellets obtained from the PTK alone or of its composition with the stabilizer. The smaller the value, the less the decrease of crystallinity.

Illustrative Experiment of extrusion

To 100 parts by weight of Polymer P1 which was a PTK having good melt processability, 1 part by weight of poly(p-phenylene thioether), 1 part by weight of silica powder nd a prescribed amount of Ca(OH)$_2$ were Incidentally, the crystallinity improving effects were evaluated by preparing a sample, measuring ΔHmc and Tmc and then determining Δ(ΔHmc) and Δ(Tmc) in the same manner as described above under "Improvement to melt stability and decrease of crystallinity by the addition of a stabilizer" (this also applies hereinafter).

TABLE 4

| Run No. | Extrusion-1 | Extrusion-2 |
|---|---|---|
| Composition of pellets (parts by weight) | PTK 100<br>Ca(OH)$_2$ 0<br>PATE 1[1]<br>SiO$_2$ 1 | PTK 100<br>Ca(OH)$_2$ 0.5<br>PATE 1[1]<br>SiO$_2$ 1 |
| Crystallinity improving effects | | |
| ΔHmc (420° C./10 min) (J/g) | 29 | 49 |
| Δ(ΔHmc) (J/g) | 27 | 7 |
| Δ(Tmc) (°C.)[4] | 51 | 12 |
| Properties of extruded products | | |
| Density of PTK portion (25° C.)[2] | 1.35 g/cm$^3$ | 1.35 g/cm$^3$ |
| Tensile strength (ASTM-D638) | 10 kg/mm$^2$ | 9 kg/mm$^2$ |
| Tensile modulus (ASTM-D638) | 220 kg/mm$^2$ | 230 kg/mm$^2$ |
| Remarks | Added with no stabilizer (Comp. Ex.) | Added with[3] Ca(OH)$_2$ as stabilizer (Example) |

[1]Poly(p-phenylene thioether): "FORTRON #W214 (trade name; product of Kureha Chemical Industry Co., Ltd.)
[2]Measured by the [lithium bromide/water] system density gradient tube method. Calculation was made assuming that the densities of PTE, SiO$_2$ and Ca(OH)$_2$ be 1.35 g/cm$^3$, 2.2 g/cm$^3$ and 2.3 g/cm$^3$ respectively.
[3]Sticking of thermal decomposition products on the inner wall of the extruder was not observed.
[4]Difference between Tmc (420° C./10 min) of powder of PTK alone free of any basic compound and Tmc (420° C./10 min) of pellets obtained from the PTK composition either not added or added with Ca(OH)$_2$.

added. They were dry-blended in a Henschel mixer, charged under a nitrogen gas stream into a twin-screw extruder equipped with screwed rotatable in the same direction and a nozzle of 5 mm across and having a cylinder diameter of 35 mm, molten and kneaded at a cylinder temperature of 375° C. for an average resin residence time of about 3 minutes in the cylinder, extruded into strands, quenched and chopped. Pellet samples (Extrusion-1 and Extrusion-2) were thus obtained from the respective compositions.

The nozzle of the extruder was next replaced by a slit die. Pellet samples (Extrusion-1 and Extrusion-2) were separately fed, extruded into plates at a cylinder temperature of 375° C. and an average resin residence time of about 3 minutes in the cylinder, quenched and thereafter cut, thereby obtaining plate-like extrudates respectively. The thus-qenched extrudates were subjected to annealing at 280° C. for 5 hours to obtain extruded products (annealed products).

Physical properties of the extruded products (annealed products) obtained respectively from the pellet samples (Extrusion-1 and Extrusion-2) are summarized in Table 4.

The long-run property of the Ca(OH)$_2$-mixed pellets was good.

Illustrative Experiment of injection molding

To 100 parts by weight of Polymer P1 having good melt processability, 65 parts by weight of glass fibers (13 μm across and 3 mm long; "#ECS 03T-717K", trade name; product of Nippon Electric Glass Co., Ltd.) and a prescribed amount of Ca(OH)$_2$ powder were added. They were dry-blended in a tumbler blender, and then molten, kneaded and extruded in the same manner as in the preparation of the pellets for the extrusion experiment described above. Pellet samples (Injection-1 and Injection-2) were thus obtained from the respective compositions.

The pellet samples (Injection-1 and Injection-2) were separately charged in a nitrogen gas atmosphere into an injection molding machine and then injection molded under the following conditions to obtain injection-molded products. Cylinder temperature: 375° C., mold temperature: 200° C., resin residence time in cylinder: up to 1.5 minutes, injection maintaining pressure: 1,000 kg/cm$^2$, and injection cycle: about 1 minute. The injection-molded products were annealed at 280° C. for 5 hours. Physical properties of the annealed molded products are summarized in Table 5.

The Ca(OH)$_2$-added pellets showed good long-run property.

TABLE 5

| Run No. | Injection-1 | Injection-2 |
|---|---|---|
| Composition of pellets (parts by weight) | PTK 100<br>Ca(OH)$_2$ 0<br>Glass fibers 65 | PTK 100<br>Ca(OH)$_2$ 0.5<br>Glass fibers 65 |
| Crystallinity improving effects | | |
| ΔHmc (420° C./10 min) (J/g) | 22 | 46 |
| Δ(ΔHmc) (J/g) | 34 | 10 |
| Δ(Tmc) (°C.) | 53 | 13 |
| Properties of injection-molded products | | |
| Density of PTK portion (25° C.)[1] | 1.35 g/cm$^3$ | 1.35 g/cm$^3$ |
| Flexural strength (ASTM-D760) | 28 kg/mm$^2$ | 27 kg/mm$^2$ |

TABLE 5-continued

| Run No. | Injection-1 | Injection-2 |
| --- | --- | --- |
| Flexural modulus (ASTM-D760) | 1800 kg/mm$^2$ | 1850 kg/mm$^2$ |
| Flexural deformation (ASTM-D760) | 6 mm | 5.8 mm |
| Remarks | Added with no stabilizer (Comp. Ex.) | Added with[2] Ca(OH)$_2$ as stabilizer (Example) |

[1]Measured in the same manner as in Table 4. Calculation was made assuming that the density of glass fibers was 2.54 g/cm$^3$.
[2]Sticking of thermal decomposition products on the inner wall of the injection molding machine was not observed.

Preparation of formed fibrous products

Polymer P1 having good melt processability was added with a prescribed amount of fine powder of Ca(OH)$_2$. They were dry-blended in a tumbler blender, and then molten, kneaded and extruded in the same manner as in the preparation of the pellets in the aforementioned extrusion experiment. Pellet samples (Spinning-1 and Spinning-2) were obtained respectively. The pellet samples were separately fed to a melt-spinning testing machine (manufactured by Fuji Filter Company) equipped with a spinneret which had 18 holes, each of 0.5 mm across, and then melt-spun at R$_1$ of about 70 times so that their corresponding unstretched fibers were obtained. Using a device, the fibers were stretched at 155° C. to a draw ratio of 3 times. They were thereafter heat set at 280° C. for 2 seconds. Physical properties of the resultant fiber samples are shown in Table 6. The Ca(OH)$_2$-added pellets showed good long-run property.

TABLE 6

| Run No. | Spinning-1 | Spinning-2 |
| --- | --- | --- |
| Composition of pellets (parts by weight) | PTK 100 Ca(OH)$_2$ 0 | PTK 100 Ca(OH)$_2$ 0.5 |
| Crystallinity improving effects | | |
| ΔHmc (420° C./10 min) (J/g) | 31 | 50 |
| Δ(ΔHmc) (J/g) | 25 | 6 |
| Δ(Tmc) (°C.) | 55 | 14 |
| Properties of formed fibrous products | | |
| Density (25° C.) | 1.36 g/cm$^3$ | 1.36 g/cm$^3$ |
| Fineness | about 30 μm | about 30 μm |
| Tensile strength | 30 kg/mm$^2$ | 28 kg/mm$^2$ |
| Tensile modulus | 380 kg/mm$^2$ | 390 kg/mm$^2$ |
| Remarks | Added with no Ca(OH)$_2$ (Comp. Ex.) | Added with[1] Ca(OH)$_2$ (Example) |

[1]Sticking of thermal decomposition products on the inner wall of the extruder was not observed.

Preparation of formed film-like products

The above-described pellet samples (Spinning-1 and Spinning-2) were separately fed under a nitrogen gas stream to a single-screw extruder having a cylinder diameter of 35 mm and equipped with a small T-die, melt-extruded at a cylinder temperature of 375° C. for a resin residence time of about 3 minutes in the cylinder and quenched by cooling rolls, so that amorphous films having an average thickness of 150 μm were prepared respectively.

Portions of the thus-obtained amorphous fims were separately sandwiched between polyimide films ("Kapton", trade mark; product of E. I. du Pont de Nemours & Company), heat set at 310° C. for 5 minutes under pressure by using a hot press, and then subjected to thermal relaxation at 290° C. for 5 minutes without pressure. Physical properties of the thus-obtained unstretched films are shown in Table 7.

TABLE 7

| Run No. | Film-1 | Film-2 |
| --- | --- | --- |
| PTK pellets used | Spinning-1 | Spinning-2 |
| Crystallinity improving effects | | |
| ΔHmc (420° C./10 min) (J/g) | 31 | 50 |
| Δ(ΔHmc) (J/g) | 25 | 6 |
| Δ(Tmc) (°C.) | 55 | 14 |
| Properties of formed film-like products | | |
| Density (25° C.)[1] (g/cm$^3$) | 1.35 | 1.35 |
| Tensile strength (kg/mm$^2$) | 14 | 13 |
| Tensile Modulus (kg/mm$^2$) | 230 | 250 |
| Remarks | Added with no Ca(OH)$_2$ (Comp. Ex.) | Added with[1] Ca(OH)$_2$ (Example) |

[1]Measured in the same manner as in Table 6.

Preparation of stretched films

With respect to portions of the amorphous films obtained respectively from pellet samples (Spinning-1 and Spinning-2) upon preparation of the unstretched films, they were separately stretched at 155° C. to a draw ratio of 3.0 times in the machine direction and then at 157° C. to a draw ratio of 2.9 times in the transverse direction, heat set at 310° C. for 5 minutes under a constant length, and then subjected to thermal relaxation at 290° C. for 5 minutes under no stress, so that biaxially-stretched films were prepared respectively. Physical properties of the thus-obtained stretched and oriented films are given in Table 8.

TABLE 8

| Run No. | Stretched film 1 | Stretched film 2 |
| --- | --- | --- |
| PTK pellets used | Spinning-1 | Spinning-2 |
| Crystallinity improving effects | | |

TABLE 8-continued

| Run No. | Stretched film 1 | Stretched film 2 |
|---|---|---|
| $\Delta Hmc$ (420° C./10 min) (J/g) | 31 | 50 |
| $\Delta(\Delta Hmc)$ (J/g) | 25 | 6 |
| $\Delta(Tmc)$ (°C.) | 55 | 14 |
| Properties of stretched films | | |
| Density (25° C.) | 1.36 g/cm³ | 1.36 g/cm³ |
| Machine/transverse tensile strength | 16/15 kg/mm² | 18/17 kg/mm² |
| Machine/transverse tensile modulus | 390/380 kg/mm² | 390/385 kg/mm² |
| Coefficient of surface dynamic friction[1] (25° C.) | >1 | 0.6 |
| Remarks | Added with no Ca(OH)₂ (Comp. Ex.) | Added with[1] Ca(OH)₂ (Example) |

[1]Measured against another film of the same type in accordance with ASTM-D 1894.

We claim:

1. A melt-stable poly(arylene thioether-ketone) composition improved in melt stability and crystallinity, comprising:

(A) 100 parts by weight of a melt-stable poly(arylene thioether-ketone) having predominant recurring units of the formula

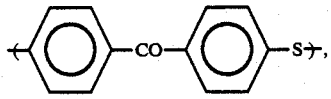

wherein the —CO— and —S— are in the para position to each other, and having the following physical properties (a)–(c):

(a) melting point, Tm being 310°–380° C.;

(b) residual melt crystallization enthalpy, $\Delta Hmc$ (420° C./10 min) being at least 10 J/g, and melt crystallization peak-temperature, Tmc (420° C./10 min) being at least 210° C., wherein $\Delta Hmc$ (420° C./10 min) and Tmc (420° C./10 min) are determined by a differential scanning calorimeter at a cooling rate of 10° C./min after the poly(arylene thioether-ketone) is held at 50° C. for 5 minutes in an inert gas atmosphere, heated to 420° C. at a rate of 75° C./min and then held for 10 minutes at 420° C.;

(c) reduced viscosity being 0.2–2 dl/g as determined by viscosity measurement at 25° C. and a polymer concentration of 0.5 g/dl in 98 percent by weight sulfuric acid; and (B) 0.1–30 parts by weight of at least one basic compound selected from the group consisting of the hydroxides, oxides and aromatic carboxylic acid salts of Group IIA metals of the periodic table other than magnesium, and the hydrocarbyl oxides, aromatic carboxylic acid salts, carbonates, hydroxides, phosphates and borates of Group IA metals of the periodic table, said phosphates and borates including condensation products.

2. The poly(arylene thioether-ketone) composition as claimed in claim 1, wherein the composition has a $\eta_{60}^*/\eta_5^*$ ratio of from 0.5 to 10 in which $\eta_5^*$ is a melt viscosity of the composition as measured at a shear rate of 1200 sec$^{-1}$ after holding the composition at 385° C. for 5 minutes and $\eta_{60}^*$ melt viscosity of the composition as measured at a shear rate of 1200 sec$^{-1}$ after holding the composition at 385° C. for 60 minutes.

3. The composition a claimed in claim 1, wherein the poly(arylene thioether-ketone) has a density of at least 1.34 g/cm³ at 25° C. when annealed at 280° C. for 30 minutes.

4. The composition as claimed in claim 1, wherein the poly(arylene thioether-ketone) is an uncured polymer.

5. The composition as claimed in claim 1, further comprising (C) at least one thermoplastic resin in a proportion from 0 part by weight to 400 parts by weight per 100 parts by weight of the melt-stable poly(arylen thioether-ketone) (Component A) and (D) at least one filler selected from the group consisting of inorganic fillers other than said at least one basic compound (Component B) and fibrous fillers, said at least one filler being contained in a proportion from 0 part by weight to 400 parts by weight per 100 parts by weight of the sum of the melt-stable poly(arylene thioether-ketone) and the said at least one thermoplastic resin (Component A+Component C).

* * * * *